United States Patent [19]

Choi et al.

[11] 4,339,415

[45] Jul. 13, 1982

[54] RECOVERY OF SOLUBLE ALUMINA VALUES FROM ALUMINA BEARING ORES

[75] Inventors: John I. Choi, Camillus; Bruce E. Kurtz, Marcellus; Anatoli Omelian, Camillus, all of N.Y.

[73] Assignee: Allied Corporation, Morris County, Morris Township, N.J.

[21] Appl. No.: 213,273

[22] Filed: Dec. 5, 1980

[51] Int. Cl.$^3$ ............................................. C01F 7/56
[52] U.S. Cl. ................................. 423/126; 423/111; 423/131; 423/132
[58] Field of Search ............... 423/111, 131, 132, 126

[56] References Cited

U.S. PATENT DOCUMENTS

| 893,590 | 7/1908 | Langenbeck | 423/132 |
| 1,148,156 | 7/1915 | Dougherty | 423/132 |
| 1,863,986 | 6/1932 | Jourdan | 423/111 |
| 1,999,773 | 4/1935 | McMichael | 423/132 |
| 2,224,888 | 12/1940 | Walthall | 423/111 |
| 4,177,242 | 12/1979 | Cohen et al. | 423/132 |

FOREIGN PATENT DOCUMENTS

| 2360515 | 3/1978 | France | 423/132 |
| 167555 | 8/1921 | United Kingdom | 423/111 |

Primary Examiner—Herbert T. Carter
Attorney, Agent, or Firm—Thomas D. Hoffman

[57] ABSTRACT

A process for the recovery of soluble alumina values from alumina-bearing ores comprising simultaneously contacting a stream containing an effective amount of a reducing agent such as $SO_2$ and a stream containing an effective amount of an oxidizing agent such as $Cl_2$ with an aqueous slurry of the alumina-bearing ores for a time sufficient to remove at least about 50 weight percent of the soluble alumina values from said ores is disclosed.

13 Claims, No Drawings

RECOVERY OF SOLUBLE ALUMINA VALUES FROM ALUMINA BEARING ORES

DESCRIPTION

BACKGROUND OF THE INVENTION

This invention relates to a process for recovery of soluble alumina values from alumina-bearing ores, especially calcined domestic clays by simultaneous addition of an oxidizing agent and a reducing agent into an aqueous slurry of said alumina-bearing ores.

Alumina values are typically recovered from alumina-bearing ores, normally bauxite, by digesting said ores with hot aqueous sulfuric acid. Due to increased cost for imported and domestic bauxite and the limited supplies of domestic bauxite, the development of a commercial process for extracting alumina from domestic alumina-bearing ores, especially low-grade domestic clays, presents an important technological problem that has not yet been solved satisfactorily. For example, the Bureau of Mines Report of Investigations No. 6133, U.S. Department of the Interior, 1962 entitled "Methods for Producing Alumina from Clay" discloses an evaluation of five hydrochloric acid processes for producing alumina from clay. In one of these processes, calcined clay is digested with hydrochloric acid to produce a slurry containing soluble alumina values which is filtered to remove the insoluble silica residue. The filtrate containing soluble alumina values and soluble iron salts is treated with HCl gas to precipitate the soluble alumina as aluminum chloride hexahydrate while soluble iron remains in the filtrate. The aluminum chloride hydrate is calcined to form alumina.

U.S. Pat. No. 3,862,293 (Maurel et al.) describes a process for the selective recovery of alumina, iron, magnesium and alkali metal sulfates by digesting, at high temperature, alumina-bearing clays with concentrated sulfuric acid containing chlorine gas to precipitate iron and potassium sulfates and by-product HCl, which is recycled to precipitate aluminum chloride hexahydrate. In spite of these disclosures, there is still a need for a process to recover soluble alumina values from alumina-bearing ores, especially low-grade alumina domestic clays.

It is accordingly an object of this invention to provide a process to recover soluble alumina values from alumina-bearing ores. It is also an object of this invention to provide a low energy process to recover soluble alumina values from alumina-bearing ores, especially low-grade domestic clays.

SUMMARY OF THE INVENTION

In accordance with the practice of the present invention, there is provided a process for recovery of soluble alumina values from alumina-bearing ores which comprises the steps of (a) preparing an aqueous slurry of alumina-bearing ore; (b) simultaneously contacting said aqueous slurry with a stream containing an effective amount of an oxidizing agent and a stream containing an effective amount of a reducing agent, the oxidizing agent and the reducing agent being selected such that the simultaneous contacting of the oxidizing agent and the reducing agent with said aqueous slurry provides appropriate chemical ions and sufficient energy to remove soluble alumina values from said alumina-bearing ores; (c) maintaining said simultaneous contact for a time sufficient to remove at least about 50 weight percent of the soluble alumina values from the alumina-bearing ore and to form a soluble alumina solution and insoluble materials; (d) separating said soluble alumina solution from said insoluble materials; and (e) recovering the soluble alumina values from said solution.

DETAILED DESCRIPTION OF THE INVENTION

The present invention utilizes the simultaneous contact of a stream containing an effective amount of a reducing agent and a stream containing an effective amount of an oxidizing agent with an aqueous slurry of an alumina-bearing ore to remove the soluble alumina values therein.

The oxidizing agents considered within the scope of the present invention are those oxidizing agents which gain electrons upon simultaneous contact with reducing agents which lose electrons. The reducing agents considered within the scope of the present invention are those reducing agents which lose electrons upon simultaneous contact with oxidizing agents which gain electrons. It is a special feature of the present invention that the simultaneous contact of the appropriate oxidizing and reducing agents with an aqueous slurry of an alumina-bearing ore not only provides the appropriate chemical ions able to solubilize alumina but also spontaneously provides sufficient energy to extract the soluble alumina values from the alumina-bearing ore; no external heat or chemical additives are necessary. The appropriate chemical ions able to solubilize alumina from alumina-bearing ores are aqueous $H^+$ in combination with aqueous $F^-$, $Cl^-$, $Br^-$ or mixtures thereof and with aqueous $SO_4^=$, $NO_2^-$, $NO_3^-$ or mixtures thereof. The soluble alumina values are removed from an aqueous slurry of an alumina-bearing ore by simultaneous contact therewith of an oxidizing agent and a reducing agent to form mixtures of hydrated aluminum chloride, such as $AlCl_3 \cdot 6H_2O$ and hydrated aluminum sulfate, and mixtures thereof, hydrated aluminum chloride and aluminum nitrate or alkali metal analogues thereof such as $Li^+$, $Na^+$, or $K^+$, preferably $K^+$.

Illustrative of the oxidizing agents useful in the process of the present invention are $F_2$, $Cl_2$ and $Br_2$ and illustrative of the reducing agents useful in the process of the present invention are $SO_2$, $NO$, $NO_2$, $M_2S_2O_4$ or $MHSO_3$ wherein M is an alkali metal cation such as $Li^+$, $Na^+$ or $K^+$, preferably $K^+$.

The illustrative oxidizing agents, e.g., $F_2$, and reducing agents, e.g., NO, which are gases at the normal operating temperatures (25°–100° C.) and pressures can conveniently be added to the aqueous slurry of the alumina-bearing ore as gases; $Br_2$ can be added thereto neat or admixed with an inert gaseous or liquid substance; ionic substances, e.g., $MHSO_3$ can be added as an aqueous solution.

The effective amounts of the illustrative oxidizing agents and of the illustrative reducing agents found useful for recovery of soluble alumina values from alumina-bearing ores correspond to at least about the stoichiometric amounts of the oxidizing agent and of the reducing agent required to react with all the alumina originally present in the alumina-bearing ore.

The following equations illustrate the hot aqueous solutions produced in accordance with the present invention containing appropriate chemical ions capable of solubilizing alumina values from aqueous slurries of alumina-bearing ores:

$$Cl_2 + 2NO_2 + 2H_2O \rightarrow 2HCl + 2HNO_3 + Heat \quad (a)$$

$$Cl_2 + 2NO + 2H_2O \rightarrow 2HCl + 2HNO_2 + Heat \quad (b)$$

$$3Cl_2 + K_2S_2O_4 + 4H_2O \rightarrow 2KCl + 4HCl + 2H_2SO_4 + Heat \quad (c)$$

$$Cl_2 + KHSO_3 + H_2O \rightarrow KCl + HCl + H_2SO_4 + Heat \quad (d)$$

$$F_2 + SO_2 + 2H_2O \rightarrow 2HF + H_2SO_4 + Heat \quad (e)$$

$$Cl_2 + SO_2 + 2H_2O \rightarrow 2HCl + H_2SO_4 + Heat \quad (f)$$

$$Br_2 + SO_2 + 2H_2O \rightarrow 2HBr + H_2SO_4 + Heat \quad (g)$$

The "Heat" listed on the right hand side of the equations (a-g) is the energy spontaneously produced by simultaneous contact of the reactants on the left hand side of said equation and is sufficient energy to allow the appropriate chemical ions, for example aqueous $H^+$, $Cl^-$, $NO_3^-$, etc. from equation (a), to extract the soluble alumina ions from the alumina-bearing ore.

While chlorine gas, the preferred oxidizing agent and sulfur dioxide gas, the preferred reducing agent have limited solubilities in water, the simultaneous addition of an effective amount of chlorine gas and an effective amount of sulfur dioxide gas to an aqueous slurry of calcined, alumina-bearing clay produces an aqueous solution of HCl and sulfuric acid, which reacts exothermically with the soluble alumina values in the aqueous slurry of clay to produce a slurry of soluble alumina values such as hydrated aluminum chloride (e.g., $AlCl_3 \cdot 6H_2O$) and hydrated aluminum sulfate (e.g., $Al_2(SO_4)_3 \cdot 6H_2O$) in addition to insoluble materials.

The chemical equation for the above-described system may be written as follows:

$$4Cl_2 + 4SO_2 + 14H_2O + \underset{\text{alumina-bearing ore}}{2(Al_2O_3 + 2SiO_2)} \longrightarrow$$

$$2AlCl_3 \cdot 6H_2O + Al_2(SO_4)_3 \cdot 6H_2O + 2HCl + H_2SO_4 + 4SiO_2 + Heat$$

For simplicity, components in the alumina-bearing ore such as oxides of titanium and iron are not included.

The alumina-bearing ores useful in the process of the present invention include bauxite, calcined clays, mixtures of bauxite and calcined clays, and anorthosite. Anorthosite should be heated at elevated temperatures with limestone to remove calcium and to make soluble the alumina values contained therein. For economic reasons, calcined low-grade alumina-bearing domestic clays are preferred. Calcination of the raw clay, especially domestic clays, is performed before contact with the oxidizing and reducing agents of the present invention in order to remove volatile impurities and to improve the alumina content soluble in the acidic media.

In practice of the present invention, a stream of chlorine gas and a stream of sulfur dioxide gas are simultaneously added via separate inlets to a stirred insulated reactor of any convenient design and containing an aqueous slurry of calcined domestic clay having at least about 9 weight percent calcined clay based on the total weight of the slurry. The temperature of the aqueous slurry simultaneously contacted spontaneously rises from ambient temperature (25°–30° C.) to about 100° C.; no external heat need be supplied to a properly insulated reactor. The total amounts of chlorine and of sulfur dioxide correspond to about the stoichiometric amounts of chlorine and sulfur dioxide required to react with all the alumina originally in the calcined clay. At least about 50 weight percent of the soluble alumina values present in the calcined clays are recovered after about 3 hours of simultaneous contact at a temperature of about 100° C. The amount of soluble alumina values recovered increases as the weight percent clay in water increases. See Example No. 8, wherein 75 weight percent of the soluble alumina originally present in the clay is recovered therefrom by contact of chlorine and sulfur dioxide gases with a slurry of calcined clay containing about 23 weight percent clay per weight of water. Generally, the hot reaction mixture is filtered to remove insoluble materials. Upon cooling the filtrate to ambient temperature, a mixture of crystalline hydrated aluminum sulfate and hydrated aluminum chloride was recovered. Alternatively, crystalline aluminum chloride hexahydrate, substantially free of aluminum sulfate crystals, is recovered from the hot filtrate by addition thereto of excess hydrochloric acid. Soluble alumina substantially free of insoluble impurities can be produced from calcined domestic clay in accordance with the process of the present invention by calcination of the crystalline products such as crystalline aluminum chloride hexahydrate at appropriate temperature.

THE EXAMPLES

EXAMPLE 1

120 grams of calcined Georgia clay, containing 48 weight percent $Al_2O_3$, 49 weight percent $SiO_2$, 2 weight percent $TiO_2$, and 1 weight percent $Fe_2O_3$ was mixed with 1200 mL of water in a 1,500 mL Pyrex® resin jar with stirring. To this slurry at 26° C., sulfur dioxide gas was introduced at a rate of 1.62 grams per minute for 48 minutes. The temperature of the aqueous clay slurry at this point was 32° C. and the pH thereof was 1.2. The addition of sulfur dioxide gas to the clay slurry raises the reaction temperature thereof from 26° C. to 32° C. within 45 minutes. The recovery of soluble alumina from the aqueous phase after 48 minutes was 3.2 weight percent of the soluble alumina values in the calcined clay.

EXAMPLE 2

This Example demonstrates the exothermic reaction upon introduction of sulfur dioxide into an aqueous solution in the absence of clay. To 1,200 mL of water at 26.5° C. in a Pyrex resin jar, was introduced sulfur dioxide gas at a rate of 1.62 g per minute. The exothermic reaction increased the temperature of the reactor to 29° C. after 48 minutes of contact. Thus, the reaction between sulfur dioxide and water shows only a slight exothermic reaction.

EXAMPLE 3

This Example illustrates the exothermic reaction upon the addition of chlorine to a slurry of clay in water. 120 g of calcined Georgia clay as described in Example 1 was mixed with 1200 mL of water at 34° C. in a 1500 mL Pyrex resin jar. Into this slurry at 34° C., chlorine gas was bubbled through at a rate of 1 g per minute. An exothermic reaction was observed upon the introduction of chlorine into the clay slurry. The temperature of the slurry was 46° C. after 15 minutes and 27° C. after 145 minutes.

EXAMPLE 4

This Example shows that a strong exothermic reaction occurred upon contact of chlorine and sulfur dioxide with water. To the reaction product obtained from Example 2, chlorine gas and sulfur dioxide gas were introduced at rates of 1 g per minute and 1.62 g per minute, respectively. After 2 hours and 15 minutes of simultaneous contact, the temperature of the water had risen from 29° C. to 82° C.; after 180 minutes, the reaction temperature was 80° C.

EXAMPLE 5

The following Example shows the effectiveness of adding chlorine and sulfur dioxide simultaneously into the aqueous slurry of calcined clay of Example 1. To the aqueous clay slurry at 32° C. treated with $SO_2(g)$ from Example 1, chlorine gas was introduced at a rate of 1 gram per minute while continuously introducing $SO_2(g)$ at the original flow rate as described in Example 1. After 3 hours the reaction temperature was 98° C., the pH was 0 and 49.2 weight percent of the soluble alumina had been leached from the calcined clay. The reaction of chlorine and sulfur dioxide gas with the aqueous clay slurry increased the reaction temperature from 32° C. to 98° C. within 75 minutes. No external energy was supplied during the acid leaching process. After five hours of simultaneous contact, the aqueous slurry had a reaction temperature of 95° C. and a final pH equal to 0.

EXAMPLE 6

This Example demonstrates improvement of the alumina recovery by increasing the weight percent of clay in the aqueous slurry described in Example 5. Chlorine and sulfur dioxide gases were simultaneously introduced into a clay slurry at the rates of 1.0 g per minute and 1.62 g per minute, respectively, for a period of 3 hours. The crude reaction slurry was filtered to remove insolubles and the filtrate cooled to about 40° C. to allow precipitation of alumina salts which were identified as a mixture of $AlCl_3 \cdot 6H_2O$ and $Al_2(SO_4)_3$ 12–18 $H_2O$. Alumina recovery from the aqueous solution expressed as a weight percent based on the total soluble alumina originally charged is listed against clay as weight % of total slurry in Table I below.

TABLE 1

Effect of $Cl_2$—$SO_2$ Injection into an Aqueous Clay Slurry vs. Alumina Recovery

| Grams of Clay/Grams of Water | Clay, Weight % of Total Slurry | Weight Percent of $Al_2O_3$ Recovered after 3 hrs of Simultaneous Contact |
|---|---|---|
| 120/1200 | 9.1 | 49.2 |
| 240/1200 | 16.7 | 29.0* |
| 300/1200 | 20.0 | 55.0* |
| 360/1200 | 23.1 | 75.0* |

*Alumina salts are precipitated at about 40° C. or lower. Thus as the weight % clay in the slurry increases, the weight percent alumina recovered increases.

EXAMPLES 7–13

These Examples illustrate the effectiveness of alumina salt precipitation upon simultaneous introduction of chlorine-sulfur dioxide into an aqueous clay slurry (Examples 7–8). For comparative purposes, data for reaction of the slurry of calcined clay with hydrochloric acid and sulfuric acid are included (Examples 9–13). Another important feature of these Examples is that the external heat had to be supplied to maintain the reaction temperature at about 100° C. for HCl, $H_2SO_4$ digestions (Examples 9–13). Table 2 compares the effectiveness of simultaneous gaseous chlorine-sulfur dioxide leaching to that of hydrochloric acid and sulfuric acid leaching on alumina salt formation from an aqueous solution.

External heat was required to maintain the reactor temperature at 100° C. when hydrochloric acid and sulfuric acid are used for leaching clay. However, when gaseous chlorine and sulfur dioxide are simultaneously used for leaching the aqueous clay, no external heat is required. The heat of reaction in the $Cl_2$-$SO_2$ clay water system is sufficient to maintain the insulated reaction at a temperature of about 100° C. for at least 3 to 5 hours. Another unique finding from this Example is that the alumina salts can be crystallized well below the solubility of alumina in the aqueous solution (solubility of Alumina salts in water is generally 8.3 weight percent expressed as $Al_2O_3$) when chlorine and sulfur dioxide gases were simultaneously added. The total alumina dissolved for the runs of chlorine-sulfur dioxide leaching ranges from 4.65 to 5.25% expressed as $Al_2O_3$, which is well below its solubility.

TABLE 2

Reactions of Calcined Clay[a] with $Cl_2$—$SO_2$, HCl and $H_2SO_4$ in water

| | | Clay | |
|---|---|---|---|
| Example | Reagents | g/1200 g of $H_2O$ | Weight % of Total Slurry |
| 7 | 288 g $Cl_2$ + 189 g $SO_2$ | 240 | 16.7 |
| 8 | 180 g $Cl_2$ + 164 g $SO_2$ | 360 | 20.0 |
| 9 | 1200 mL of 38 wgt. % of HCl | 240[c] | 14.5 |
| 10 | 900 mL of 38 wgt. % of HCl | 240[d] | 17.6 |
| 11 | 190 mL of 97 wgt. % $H_2SO_4$ | 300[e] | 18.1 |
| 12 | 20 mL of 38 wgt. % of HCl and 190 mL of 97 wgt. % of $H_2SO_4$ | 300[f] | 18.1 |
| 13 | 60 mL of 38 wgt. % of HCl and 190 mL of 97 wgt. % of $H_2SO_4$ | 300[g] | 16.95 |

| Example | Reaction Temp. after 3 hrs. | Crystal[b] Formation | External Heat Required |
|---|---|---|---|
| 7 | 100 | Yes | No |
| 8 | 100 | Yes | No |
| 9 | 100 | No | Yes |
| 10 | 100 | No | Yes |
| 11 | 100 | No | Yes |
| 12 | 100 | No | Yes |
| 13 | 100 | No | Yes |

[a] Calcined Georgia clay particles of less than 100 mesh and containing 48 wgt. % of $Al_2O_3$, 49 wgt. % $SiO_2$, 2 wgt. % $TiO_2$ and 1 wgt. % $Fe_2O_3$.
[b] A mixture of $AlCl_3 \cdot 6H_2O + Al_2(SO_4)_3 \cdot xH_2O$ was formed in Examples 7 and 8.
[c] Clay was added to 1200 mL of 38 wgt. % HCl.
[d] Clay was added to a solution of 300 mL of $H_2O$ and 900 mL of 38 wgt. % of HCl.
[e] 190 mL of $H_2SO_4$ was added to a clay slurry in 1010 mL of $H_2O$ to form a slurry having a volume of 1200 mL and containing 25.7 wgt. % $H_2SO_4$.
[f] The slurry had a volume of 1200 mL and initially contained 1.73 wgt. % HCl and 25.7 wgt. % $H_2SO_4$.
[g] The slurry had a volume of 1200 mL and initially contained 5.0 wgt. % HCl and 25.4 wgt. % $H_2SO_4$.

We claim:
1. A process for recovery of soluble alumina values from alumina-bearing ores which comprises the steps of
   (a) preparing an aqueous slurry of alumina-bearing ore;

(b) simultaneously contacting, at ambient temperatures, said aqueous slurry with a stream containing an effective amount of an oxidizing agent and a stream containing an effective amount of a reducing agent, the oxidizing agent and the reducing agent being selected such that the simultaneous contacting of the oxidizing agent and the reducing agent with said aqueous slurry spontaneously provides appropriate chemical ions and sufficient energy to raise the temperature of the contacting to about 100° C., to remove soluble alumina values from said alumina-bearing ores, wherein the oxidizing agent is $F_2$, $Cl_2$ or $Br_2$ and wherein the reducing agent is $SO_2$, NO, $NO_2$, $M_2S_2O_4$ or $MHSO_3$ and wherein M is an alkali metal cation;

(c) maintaining said simultaneous contact at a temperature of about 100° C. for a time sufficient to remove at least about 50 weight percent of the soluble alumina values from said alumina-bearing ores and to form a soluble alumina solution and insoluble materials;

(d) separating said soluble alumina solution from said insoluble materials; and (e) recovering the soluble alumina values from said solution.

2. A process as described in claim 1 wherein the oxidizing agent is $Cl_2$.

3. A process as described in claim 1 wherein the reducing agent is $SO_2$.

4. A process as described in claim 1 wherein the reducing agent is NO.

5. A process as described in claim 1 wherein the reducing agent is $NO_2$.

6. A process as described in claim 1 wherein the reducing agent is $M_2S_2O_4$.

7. A process as described in claim 6 wherein M is potassium.

8. A process as described in claim 1 wherein the reducing agent is $MHSO_3$.

9. A process as described in claim 8 wherein M is potassium.

10. A process as described in claim 1 wherein the alumina-bearing ore is calcined clay.

11. A process as described in claim 1 wherein the oxidizing agent is $Cl_2$ and the reducing agent is $SO_2$ and wherein the amounts of $Cl_2$ and $SO_2$ added are substantially equivalent to the stoichiometric amount of aluminum in the aqueous slurry of the alumina-bearing ore, which is calcined clay.

12. A process as described in claim 11 wherein the aqueous slurry of the calcined clay is at least about 23 weight percent of clay.

13. A process as described in claim 11 which further comprises adding HCl gas to the solution containing soluble alumina values substantially free of insoluble materials, the amount of HCl being sufficient to precipitate hydrated solids containing $AlCl_3$.

* * * * *